(12) United States Patent
Wang et al.

(10) Patent No.: US 9,710,380 B2
(45) Date of Patent: Jul. 18, 2017

(54) MANAGING SHARED CACHE BY MULTI-CORE PROCESSOR

(71) Applicant: Intel Corporation, Santa Clara, CA (US)

(72) Inventors: Ren Wang, Portland, OR (US); Kevin B. Theobald, Hillsboro, OR (US); Zeshan A. Chishti, Hillsboro, OR (US); Zhaojuan Bian, Shanghai (CN); Aamer Jaleel, Northborough, MA (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 551 days.

(21) Appl. No.: 14/013,220

(22) Filed: Aug. 29, 2013

(65) Prior Publication Data
US 2015/0067259 A1  Mar. 5, 2015

(51) Int. Cl.
*G06F 1/18* (2006.01)
*G06F 12/0811* (2016.01)
*G06F 12/0895* (2016.01)

(52) U.S. Cl.
CPC ...... *G06F 12/0811* (2013.01); *G06F 12/0895* (2013.01); *G06F 2212/1028* (2013.01); *G06F 2212/601* (2013.01); *Y02B 60/1225* (2013.01)

(58) Field of Classification Search
CPC .... G06F 1/3287; G06F 1/3234; G06F 1/3206; G06F 1/3275; G06F 1/3243; G06F 1/3493; G06F 1/3203; G06F 1/3296; G06F 1/329; G06F 9/5094; G06F 1/26; G06F 12/0811; G06F 12/0875; G06F 2212/1028; G06F 9/4893; G06F 1/32; G06F 1/3293; G06F 12/0806; G06F 12/084; G06F 2217/78; G06F 11/076; G06F 11/2284; G06F 2212/60; G06F 2212/601; Y02B 60/1225; Y02B 60/1278
See application file for complete search history.

(56) References Cited

U.S. PATENT DOCUMENTS

| | | | |
|---|---|---|---|
| 2010/0250856 A1* | 9/2010 | Owen | G06F 12/084 711/128 |
| 2013/0080813 A1* | 3/2013 | Tarui | G06F 1/3275 713/324 |

(Continued)

OTHER PUBLICATIONS

AbouGhazaleh et al., Near-memory Caching for Improved Energy Consumption, 2005, IEEE, 1-4.*

(Continued)

*Primary Examiner* — David X Yi
*Assistant Examiner* — Candice Rankin
(74) *Attorney, Agent, or Firm* — Lowenstein Sandler LLP

(57) ABSTRACT

Systems and methods for managing shared cache by multi-core processor. An example processing system comprises: a plurality of processing cores, each processing core communicatively coupled to a last level cache (LLC) slice; and a cache control logic coupled to the plurality of processing cores, the cache control logic configured to perform one of: making an LLC slice of an inactive processing core available to an active processing core or power gating the LLC slice, based on estimating cache requirements by active processing cores.

20 Claims, 11 Drawing Sheets

(56) References Cited

U.S. PATENT DOCUMENTS

2013/0111121 A1* 5/2013 Ananthakrishnan .. G06F 12/084
 711/105
2014/0095801 A1* 4/2014 Bodas ................. G06F 12/0891
 711/135
2014/0340114 A1* 11/2014 Priore .................. H03K 19/003
 326/16

OTHER PUBLICATIONS

Wang et al., Run-time Power-gating in Caches of GPUs for Leakage Energy Savings, 2012, IEEE 1-4.*
Sen, Rathijit et al. Cache Power Budgeting for Performance, Apr. 26, 2013, pp. 1-9.*
Beckman, Bradford M., et al. "ASR: Adaptive Selective Replication for CMP Caches", Proceedings of the 39th Annual IEEE/ACM Symposium on Microarchitecture (Micro-39), 2006, pp. 1-12 http://research.cs.wisc.edu/multifacet/papers/micro06_asr.pdf.
Chang, Jichuan, et al., "Cooperative Caching for Chip Multiprocessors", Computer Sciences Department, University of Wisconsin-Madison, 12 Pages http://pages.cs.wisc.edu/~mscalar/papers/2006/isca2006-coop-caching.pdf (Last accessed Sep. 3, 2014).
Mattson, R.L. et al. "Evaluation Techniques for Storage Hierarchies", IBM Syst J, No. 2, 1970 78:117.
Qureshi, Moinuddin K. "Adaptive Spill-Receive for Robust High-Performance Caching in CMPs", IBM Research, T.J. Watson Research Center, Yorktown Heights, NY (10 Pages).
Intel Americas, Inc. U.S. Appl. No. 13/715,613, filed Dec. 14, 2012, "Power Gating a Porton of a Cache Memory".

* cited by examiner

MANAGING SHARED CACHE BY MULTI-CORE PROCESSOR

TECHNICAL FIELD

The present disclosure is generally related to processing systems, and is specifically related to systems and method for managing shared cache by multi-core processors.

BACKGROUND

Processor energy dissipation may be an important design issue for processors of various types, from low end mobile processors to high end server processors. For a typical multi-core processor, a significant portion of the total energy may be dissipated by the last level cache (LLC) and the interconnect.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
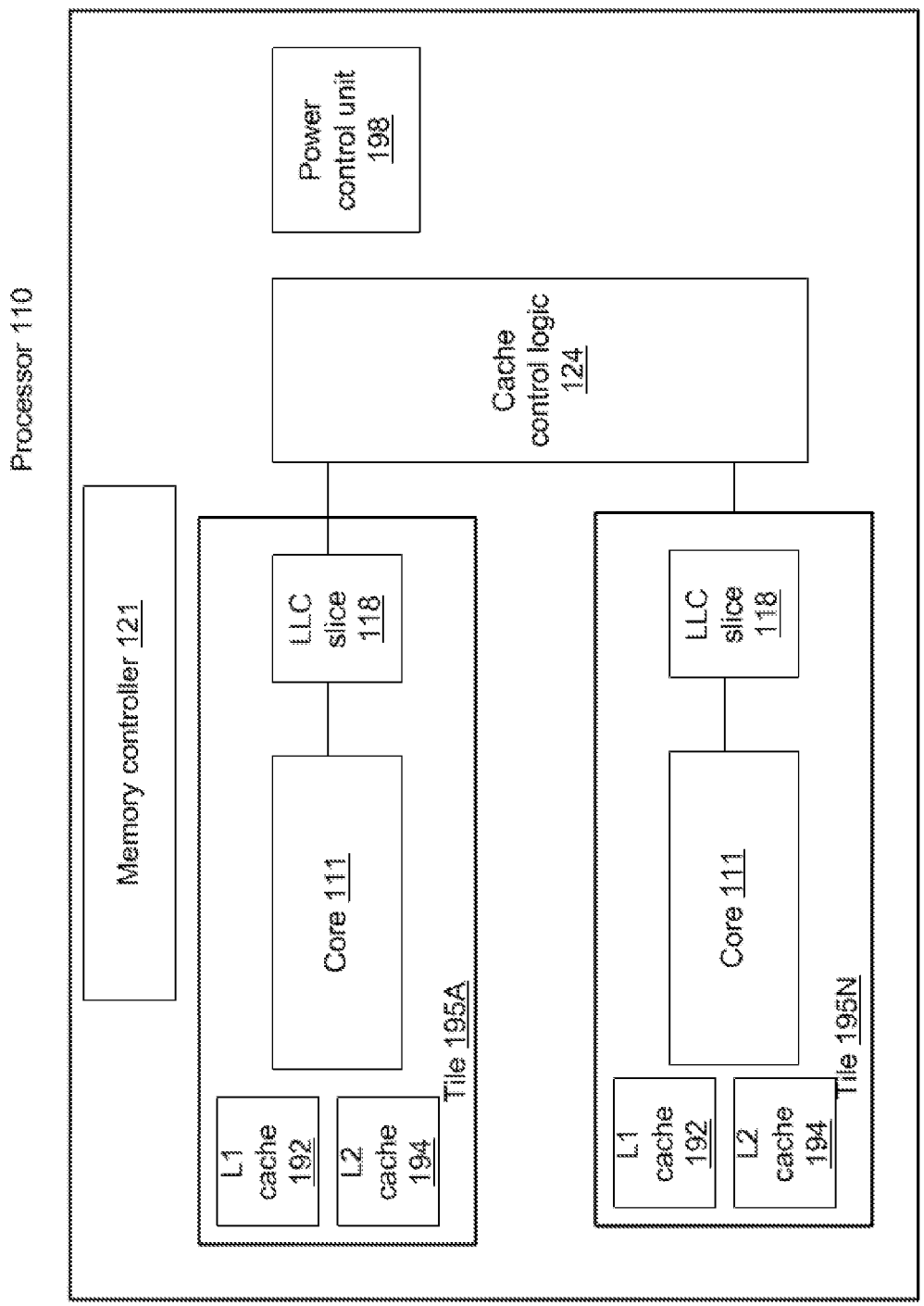
FIG. 1 depicts a high-level component diagram of an example processing system, in accordance with one or more aspects of the present disclosure.

Described herein are processing systems and related methods for managing shared cache by multi-core processors. "Processing core" herein shall refer to a single processing core or a cluster comprising two or more processing cores.

One of important design parameters of a chip multiprocessor (CMP) is the organization of the last level cache (LLC) as a private or a shared cache. A shared cache has the advantage of a large shared capacity and straightforward coherency protocols. However, a private (clustered) cache provides many desirable properties, such as reduced LLC latency (since a private cache may be located physically closer to its core) and performance isolation to prevent malicious or poorly designed applications from polluting the cache and adversely affecting other applications. A private (clustered) cache may allow energy saving by power gating certain slices of LLC when they are not being used.

However, a statically configured private/clustered LLC, as compared to a shared LLC, provides a smaller cache capacity accessible to each core, which may result in performance degradation for certain applications. Certain systems address this problem by enabling LLC capacity sharing among the processing cores, while assuming that all LLC slices are always powered on. While improving performance, this approach may lead to increased energy consumption by the processor.

To improve the energy consumption profile of a multi-processor with LLC capacity sharing, the LLC may comprise a plurality of shared LLC slices organized so that each slice may be made available to a neighboring active processing core if the processing core associated with the LLC slice is currently in a low power (inactive) state. In accordance with one or more aspects of the present disclosure, a multi-core processor, such as a multi-tile CMP, may employ a multi-level cache hierarchy comprising a private first-level cache, an optional private mid-level cache, and a shared last-level cache (LLC). The processor may comprise a cache control logic configured to make an LLC slice of an inactive processing core available to an active processing core or power gate the LLC slice. The cache control logic may be configured to choose the option which minimizes the total energy consumption by the processor and the memory.

In certain implementations, the cache control logic may be configured to make a decision whether to power on an LLC slice of an inactive core and make the LLC slice available to an active core, by comparing the energy needed to keep the LLC slice powered on and the energy needed for memory access if the LLC slice is power gated. Should the latter value exceed the former, the cache control logic may make the LLC slice available to an active processing core; otherwise, the cache control logic may power gate the LLC slice.

The energy needed to provide the memory access if the LLC slice is power gated depends on the number of cache misses requiring trips to the memory. The number of cache misses may vary depending upon the currently executed application. In accordance with one or more aspects of the present disclosure, to estimate the currently executed application cache requirements, several sets of the cache may be designated as sample sets, and may be equipped with one or more extra ways. An equal number of the remaining sets may be designated as control sets. During a chosen sampling period, the number of misses in the sample sets may be compared to the number of misses in the control sets. The difference between the two numbers may be interpreted as being indicative of how much the miss rate may be reduced by making an extra LLC slice available to the processing core.

In certain implementations, the cache control logic may be configured to compare the difference between the number of misses in the sample sets and the number of misses in the control sets to the ratio of idle power consumption of a plurality of LLC slices over a sampling period to a difference of a first energy consumed by RAM access and a second energy consumed by remote LLC access. The cache control logic may be configured to power the idle LLC slice on if the former value exceeds the latter, as described in more details herein below.

Various aspects of the above referenced methods and systems are described in details herein below by way of examples, rather than by way of limitation. In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system in accordance with one or more aspects of the present disclosure. As shown in FIG. 1, system 100 may include various components, including a processor 110.

Figure 6:
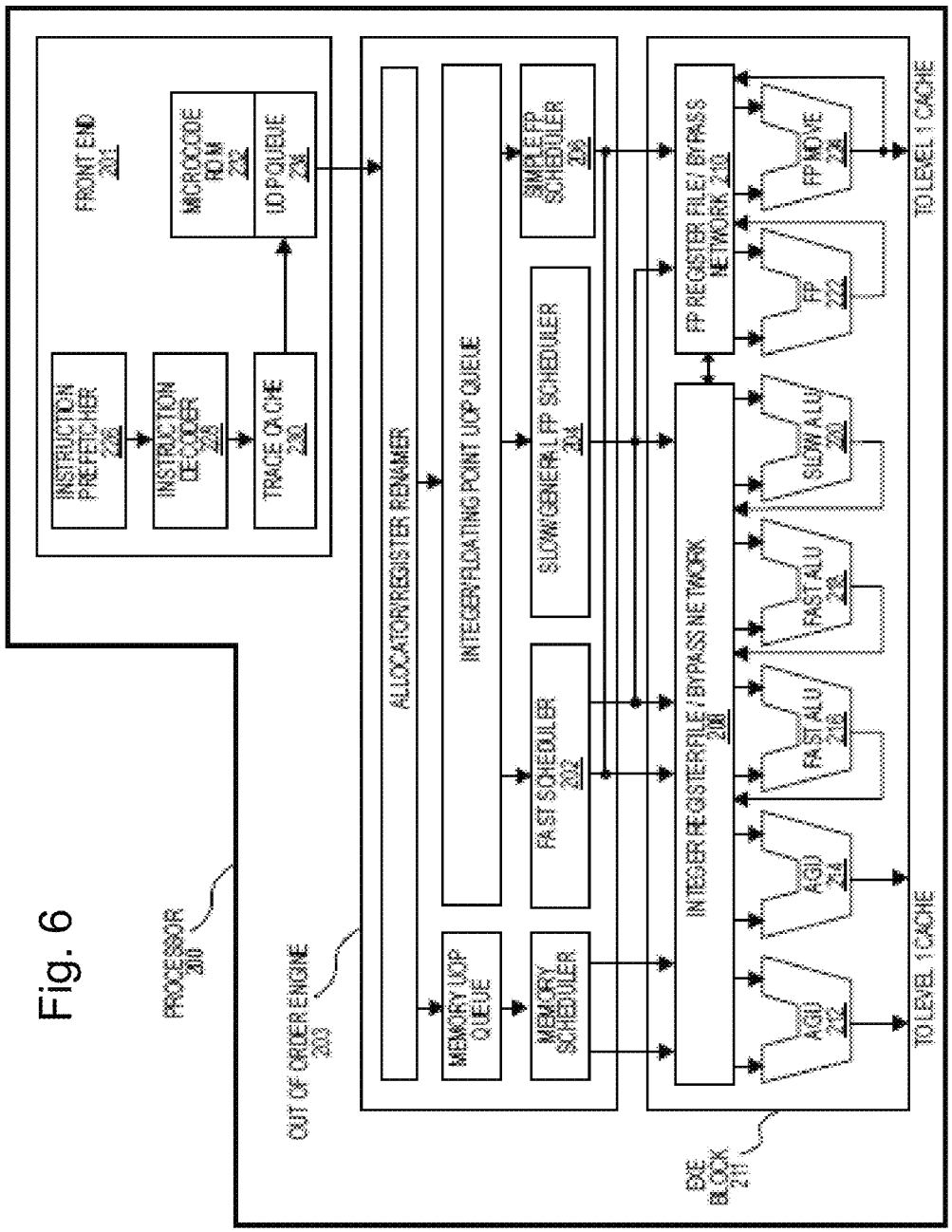
FIG. 6 depicts a block diagram of a processor, in accordance with one or more aspects of the present disclosure.

As illustrated, processor 110 may comprise a plurality of tiles 195A-195N. Each tile may comprise a processing core 111 and an associated cache hierarchy that, as described in more details herein below. Processing cores 111 in various implementations may be provided by in-order cores or out-or-order cores. In an illustrative example, processing core 111 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7.

Processing core 111 may be communicatively coupled to a first level (L1) cache 192 which, in turn, may be communicatively coupled to a mid-level cache (MLC) 194. In turn, MLC 194 may be communicatively coupled to a last level cache (LLC) slice 118. In an illustrative example, the cache hierarchy comprising L1 cache 192, MLC 194, and LLC slice 118 may be configured as an inclusive cache hierarchy, such that the information stored in L1 cache 192 may be also stored in MLC 194, and the information stored in MLC 194 may be also stored is LLC 118. In certain implementations, LLC slices 118 may be provided portions of a larger cache memory structure, so that each LLC slice may be made available to a neighboring active processing core if the processing core associated with the LLC slice is currently in a low power (inactive) state.

While FIG. 1 schematically a three-level cache hierarchy, the scope of the present disclosure is not limited in this regard, and in different implementations a two-level cache hierarchy or a cache hierarchy having greater than three levels may be provided. Also, while examples illustrating the present disclosure refer to power gating of LLC slices, in certain implementations other cache levels may be controlled in accordance with one or more aspects of the present disclosure.

Processor 110 may further comprise a memory controller 121 communicatively coupled to a system memory, such as dynamic random access memory (DRAM). Processor 110 may further comprise a power control unit (PCU) 198, which may include hardware, software and/or firmware to perform power management operations. PCU 198 may be communicatively coupled to cache control logic include logic 124 to perform LLC power control in accordance with one or more aspects of the present disclosure, as described in more details herein below. PCU 198 may be electrically coupled to an external power source (not shown in FIG. 1). While not shown in FIG. 1, various additional components may be present within processor 110.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

When a core is to be placed into a certain low power state (e.g., entering a C6 state as defined by ACPI), potentially its LLC slice can be flushed and power gated to save power. Cache control logic 124 may be configured to make an LLC slice of an inactive processing core available to an active processing core or power gate the LLC slice. To determine whether the power saving may be realized by power gating an LLC slice, the cache control logic may, in accordance with one or more aspects of the present disclosure, analyze certain performance metrics of several processing cores to choose the option which minimizes the total energy consumption by the processor and the memory.

If the cache control logic decides to power gate an LLC slice, the information stored in the LLC slice can be flushed, e.g., to another cache hierarchy of another tile, another storage within the processor package such as an eDRAM or other internal storage. Alternatively, the information can be flushed to a system memory, such as DRAM.

In certain implementations, the cache control logic may be configured to make a decision whether to make the LLC slice of a currently inactive processing core available to an active processing core, by comparing the energy needed to keep the LLC slice powered on and the energy needed for memory access if the LLC slice is power gated. Should the latter value be found to exceed the former value, the cache control logic may make the LLC slice available to an active processing core; otherwise, the cache control logic may power gate the LLC slice.

The energy needed to provide the memory access if the LLC slice is power gated depends on the number of cache misses requiring trips to the memory. The number of cache misses may vary depending upon the currently executed application.

Figure 2:
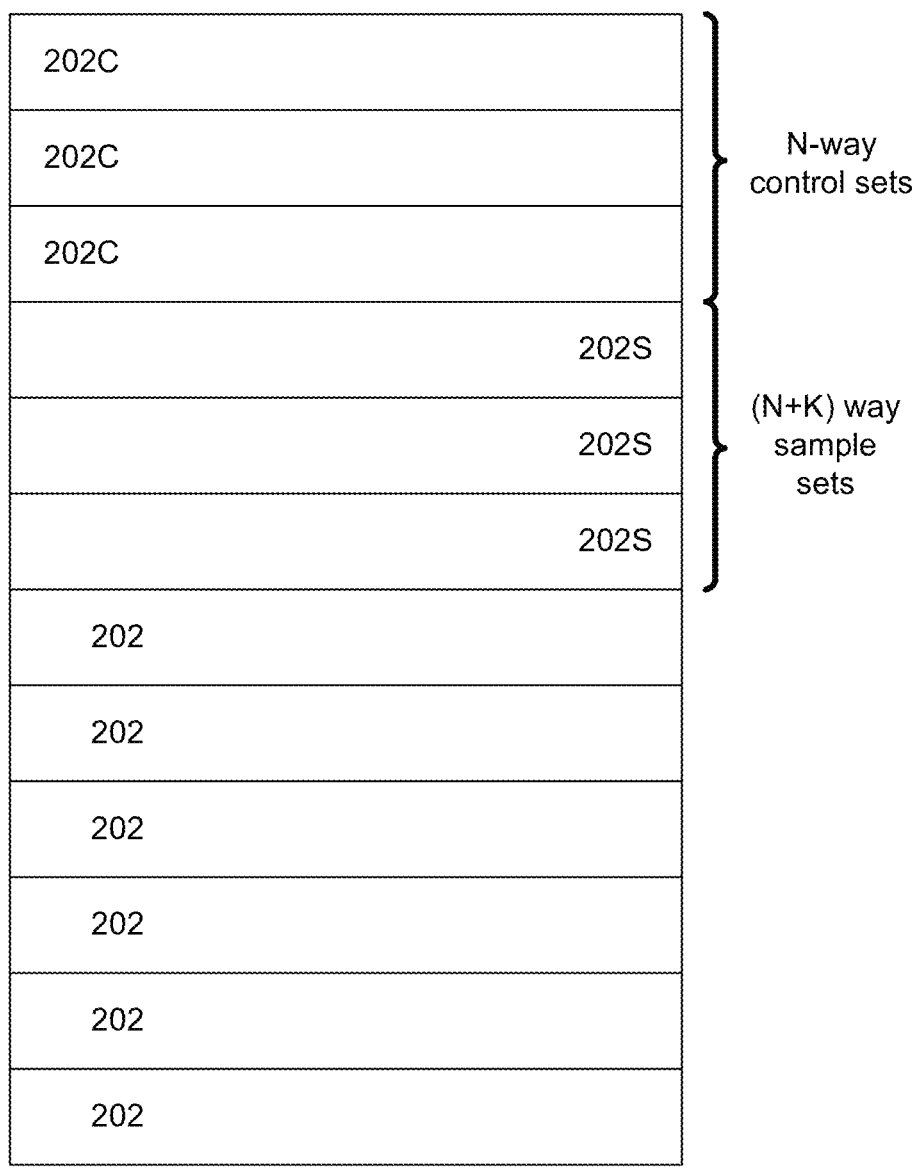
FIG. 2 depicts an example cache slice, in accordance with one or more aspects of the present disclosure.

In certain implementations, LLC cache 118 may be implemented as N-way set associative cache, such that each memory address of the system memory may be mapped to N cache sets. As schematically illustrated by FIG. 2, a pre-defined number of sets 202 of each LLC slice 118 may be designated as sample sets 202S. Each of the designated sample sets may be equipped with one or more additional associated ways. An equal number of the remaining sets may be designated as control sets 202C.

To estimate the currently executed application cache requirements, the cache control logic may compare, during a chosen sampling period, the number of misses in the sample sets to the number of misses in the control sets. Since the extra ways would reduce the miss rate in the sample sets, the difference between the number of misses in the sample sets and the number of misses in the control sets may be interpreted as being indicative of how much the miss rate may be reduced by making additional cache capacity (e.g., an extra LLC slice of a neighboring inactive core) available to the processing core.

Since the observed number of cache misses can fluctuate over several sampling periods, an exponential weighted moving average (EWMA) filter may be applied to the observed results in order to capture the workload trend:

$$M_{av} = \alpha * M_{av} + (1-\alpha) * M, \qquad (1)$$

wherein $M_{av}$ is the average number of misses observed over several sampling periods, M is the observed cache miss rate in the current sampling period, and $\alpha$ is a pre-defined parameter such that $0 <= \alpha <= 1$.

In accordance with one or more aspects of the present disclosure, the cache control logic may be configured to make an LLC slice of an inactive processing core available to an active processing core if doing so would minimize the overall system energy consumption, i.e., is the energy saved from reduced memory access is larger than the energy needed to power the LCC slice of an inactive processing core:

$$(M_s - M_c) * (S/N) * (E_{mem} - E_{rc}) > P_{idle} * T, \text{ or} \qquad (2)$$

$$M_s - M_c > (P_{idle} * T * N) / (S * (E_{mem} - E_{rc})), \qquad (3)$$

wherein $M_s$ is the number of misses in sample sets,
$M_c$ is the number of misses in control sets,
S is the total number of sets in the cache slice,
N is the number of sample sets and the number of control sets,
$E_{mem}$ is the energy consumed by a DRAM access,
$E_{rc}$ is the energy consumed by a remote cache access,
$P_{idle}$ is the idle power consumption of an LLC slice, and
T is the sampling period.

Figure 3:
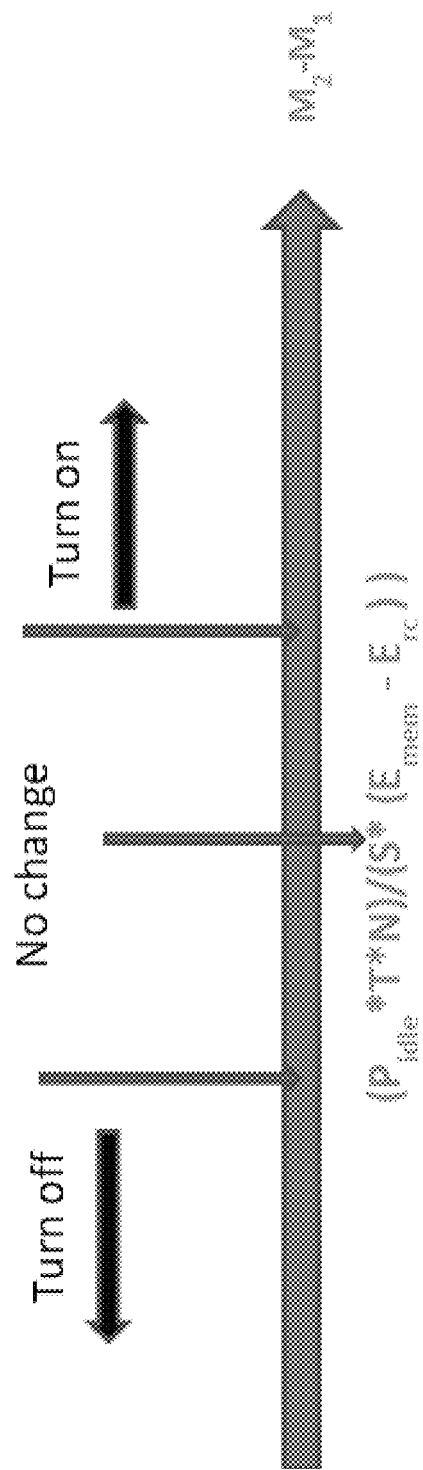
FIG. 3 schematically illustrates a formula implemented by the cache control logic, in accordance with one or more aspects of the present disclosure.

Hence, in certain implementations the cache control logic may be configured to compare the difference between the number of misses in the sample sets and the number of misses in the control sets to the ratio of idle power consumption of a plurality of LLC slices over a sampling period to a difference of a first energy consumed by RAM access and a second energy consumed by remote LLC access. The cache control logic may be configured to power the idle LLC slice on if the former value exceeds the latter. When the idle cache slice is powered on and made available to a non-idle processing core, it may be used, e.g., as a victim cache In a further aspect, flushing/reloading cache contents and entering/exiting a low power state may have certain overhead associated with the actions. Thus, a guard band may be introduced into expression (3) in order to prevent frequent oscillations, as schematically illustrated by FIG. 3.

Figure 4:
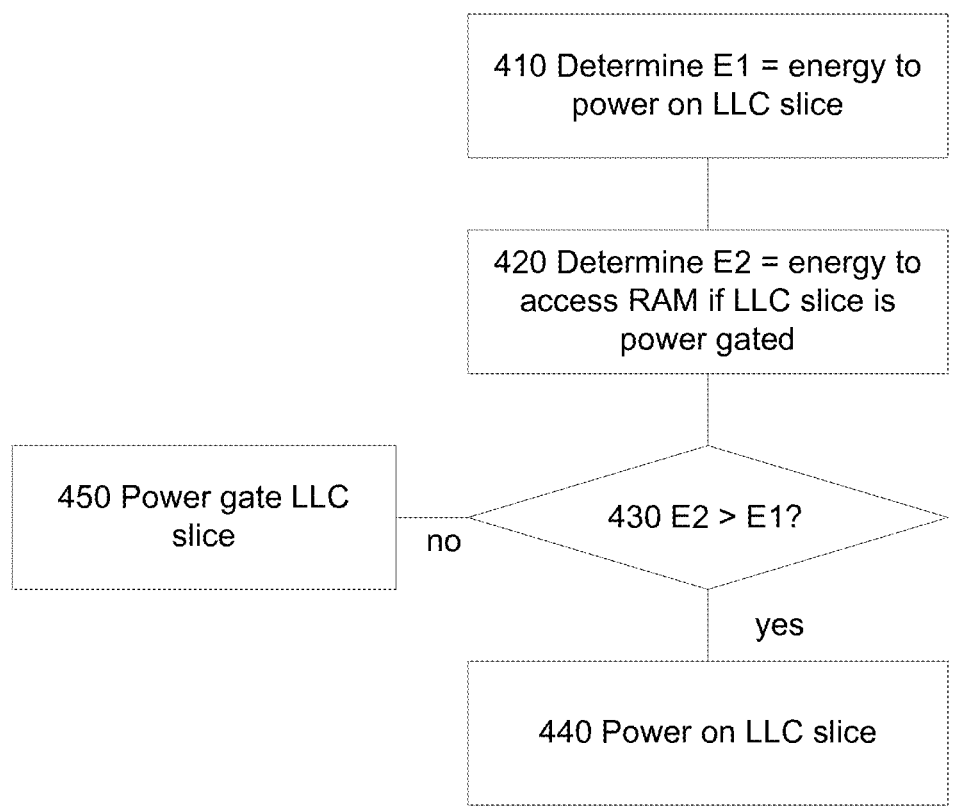
FIG. 4 depicts a flow diagram of an example method for managing shared cache, in accordance with one or more aspects of the present disclosure.

FIG. 4 depicts a flow diagram of an example method for managing shared cache by a multi-core processor, in accordance with one or more aspects of the present disclosure. The method 400 may be performed by a computer system that may comprise hardware (e.g., circuitry, dedicated logic, and/or programmable logic), software (e.g., instructions executable on a computer system to perform hardware simulation), or a combination thereof. The method 400 and/or each of its functions, routines, subroutines, or operations may be performed by one or more physical processors of the computer system executing the method. Two or more functions, routines, subroutines, or operations of method 400 may be performed in parallel or in an order which may differ from the order described above. In one example, as illustrated by FIG. 4, the method 400 may be performed by the computer systems described herein below and illustrated by FIGS. 5-11.

Referring to FIG. 4, at block 410, a processing system may determine the energy needed to power on an LLC slice of an inactive processing core, as described in more details herein above At block 420, the processing system may determine the energy needed to access the RAM by an active processing core if the LLC slice of the inactive processing core remains power gated, as described in more details herein above.

Responsive to determining, at block 430, that the energy needed to access the RAM exceeds the energy needed to power on the LLC slice, the processing system may, at block 440, power on the LLC slice. Otherwise, the processing system may, at block 450, keep the LLC slice off or power gate the LLC slice if it was powered on.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 5:
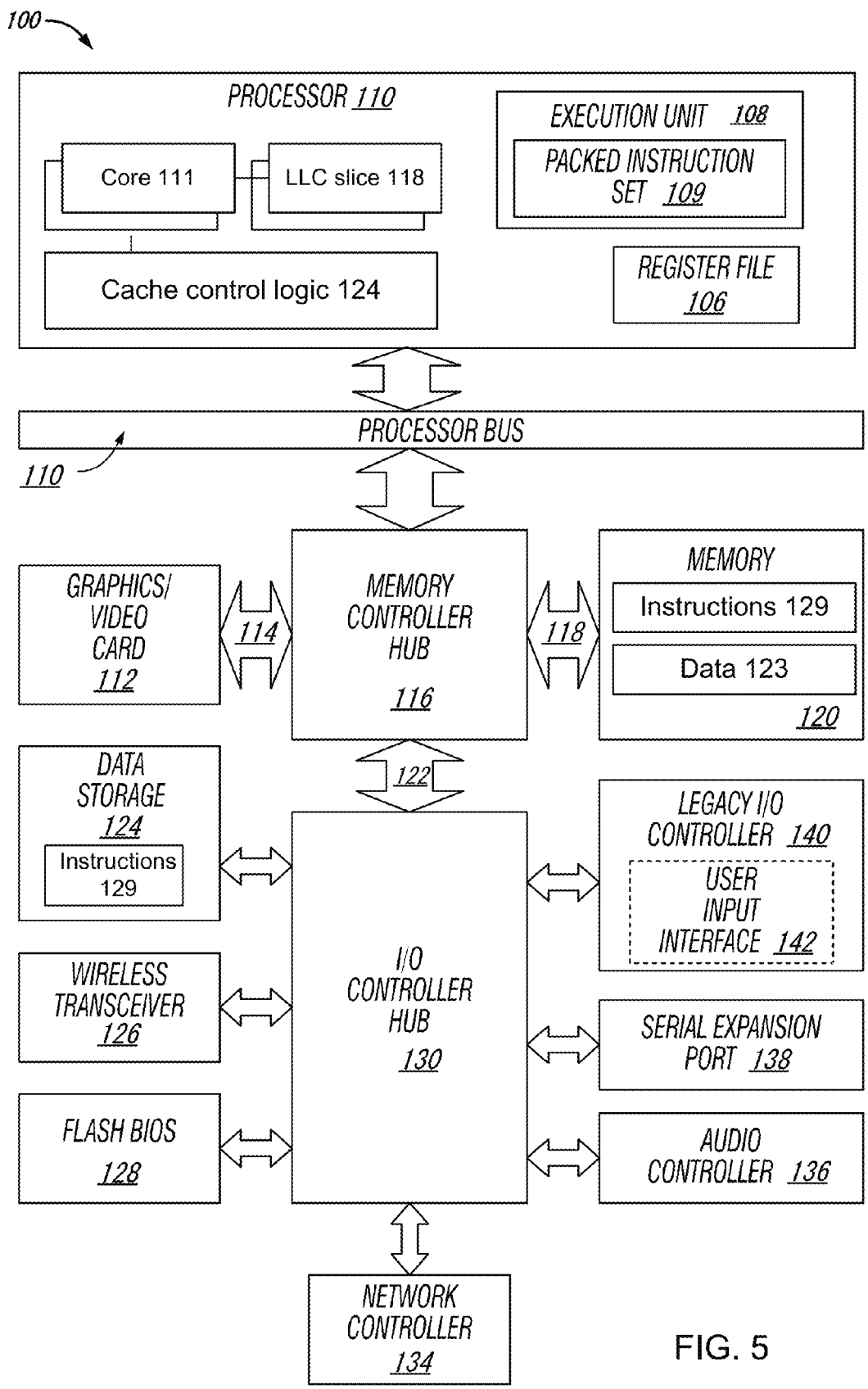
FIG. 5 depicts a high-level component diagram of an example computer system, in accordance with one or more aspects of the present disclosure.

FIG. 5 depicts a high-level component diagram of one example of a computer system in accordance with one or more aspects of the present disclosure. A computer system 100 may include a processor 110 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 110 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 110 includes a Level 1 (L1) internal cache. Depending on the architecture, the processor 110 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 110. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110. For one embodiment, execution unit 108 includes logic to handle a packed instruction set 109. By including the packed instruction set 109 in the instruction set of a general-purpose processor 110, along with associated circuitry to execute the instructions, the operations used by many multimedia applications may be performed using packed data in a general-purpose processor 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 110 may further include a cache control logic 124, the functioning of which is described in details herein below.

System 100 includes a memory 120. Memory 120 includes a dynamic random access memory (DRAM) device, a static random access memory (SRAM) device, flash memory device, or other memory device. Memory 120 stores instructions 129 and/or data 123 represented by data signals that are to be executed by the processor 110. In certain implementations, instructions 129 may include instructions employing the cache control logic 124 for managing shared cache, as described in more details herein below.

A system logic chip 116 is coupled to the processor bus 110 and memory 120. The system logic chip 116 in the illustrated embodiment is a memory controller hub (MCH). The processor 110 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 110, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 110. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 6 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7A:
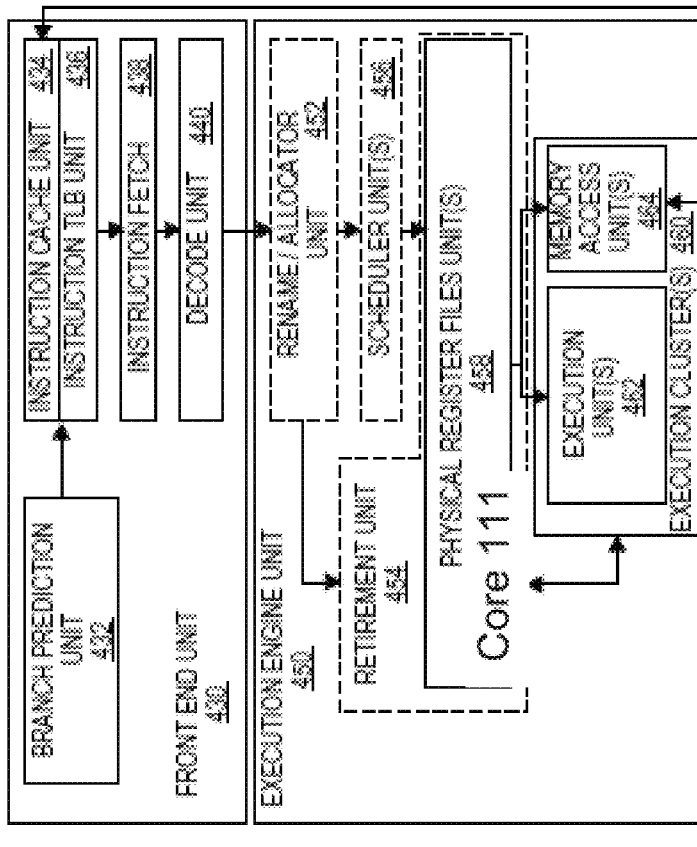
FIGS. 7a-7b schematically illustrates elements of a processor micro-architecture, in accordance with one or more aspects of the present disclosure.
Figure 7B:
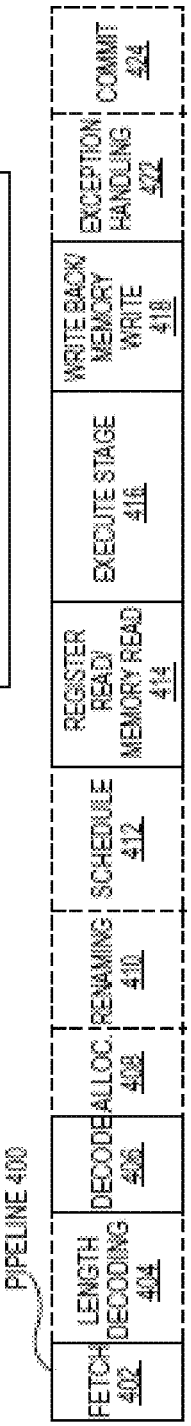

FIGS. 7a-7b schematically illustrates elements of a processor micro-architecture, in accordance with one or more aspects of the present disclosure. In FIG. 7a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 7b, arrows denote a coupling between two or more units and the direction of the arrow indicates a direction of data flow between those units. FIG. 7b shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 8:
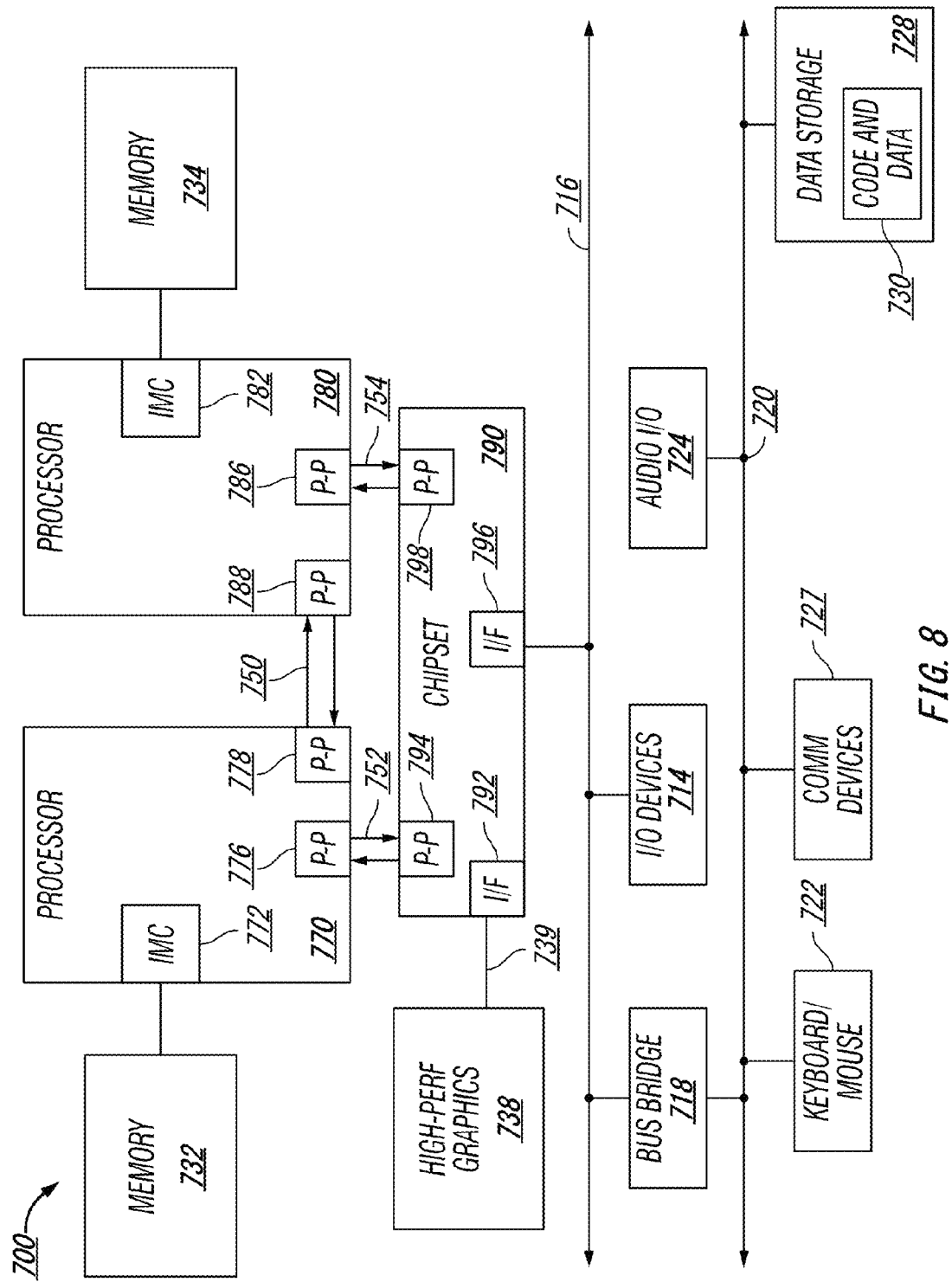
FIG. 8 depicts a block diagram of an example computer system, in accordance with one or more aspects of the present disclosure.

FIG. 8 depicts a block diagram of an example computer system, in accordance with one or more aspects of the present disclosure. As shown in FIG. 8, multiprocessor system 700 is a point-to-point interconnect system, and includes a first processor 770 and a second processor 780 coupled via a point-to-point interconnect 750. Each of processors 770 and 780 may be some version of the processor 102 capable of performing return address verification, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 8, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 8, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 9:
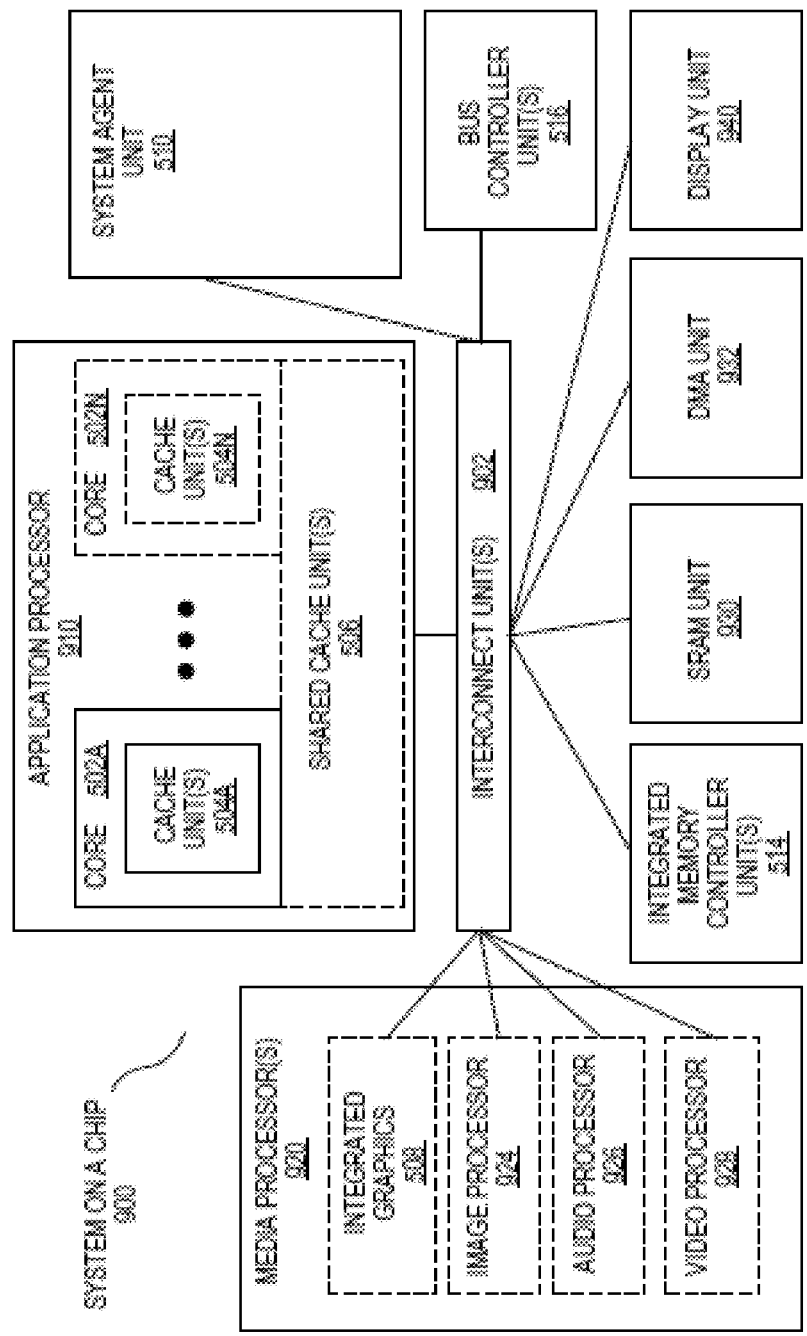
FIG. 9 depicts a block diagram of an example system on a chip (SoC), in accordance with one or more aspects of the present disclosure.

FIG. 9 depicts a block diagram of an example system on a chip (SoC), in accordance with one or more aspects of the present disclosure. The application processor 910 may be capable of performing return address verification, as described in more details herein above. As schematically illustrated by FIG. 9, interconnect unit(s) 902 may be coupled to: an application processor 910 which includes a set of one or more cores 502A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
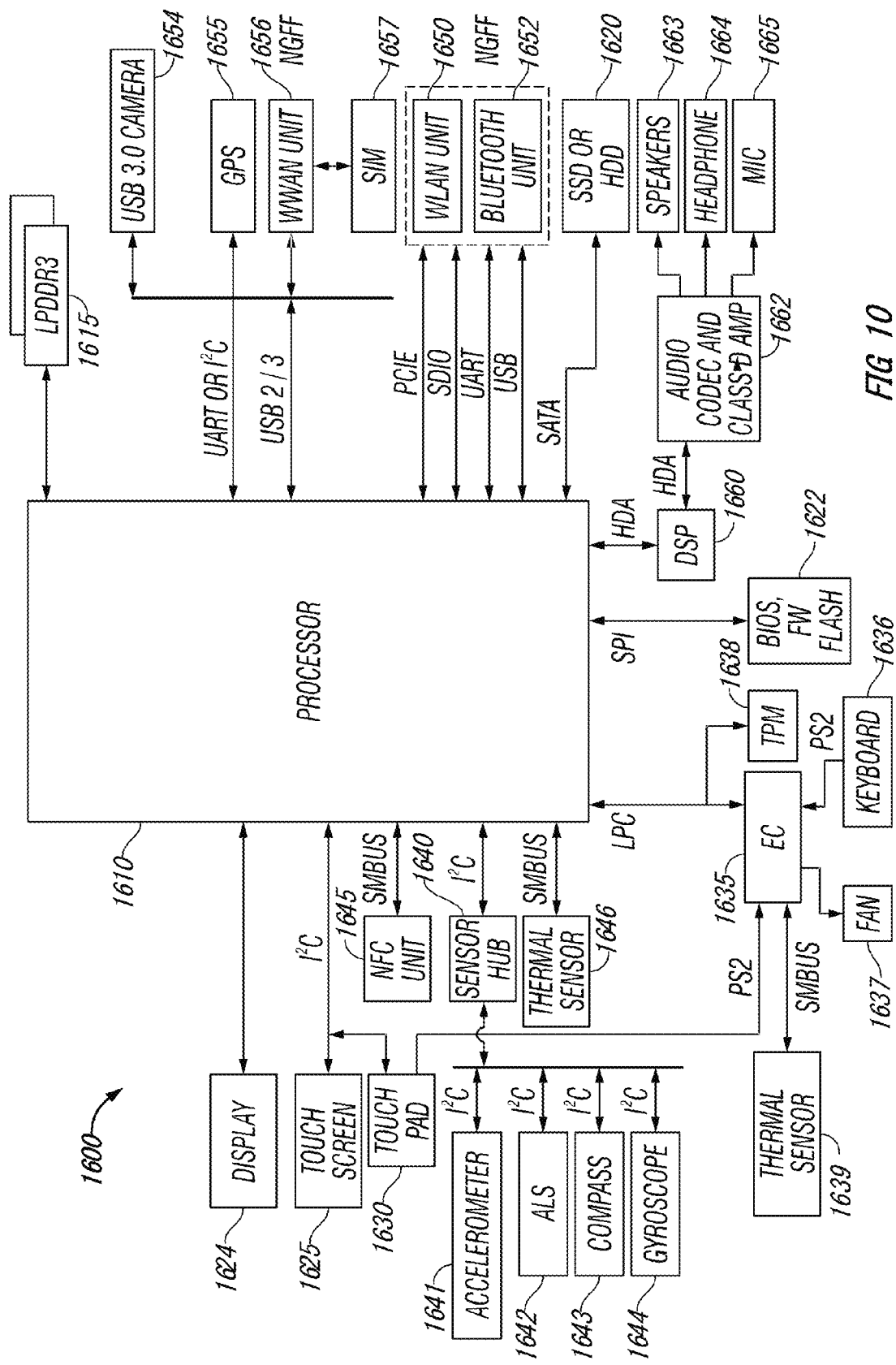
FIG. 10 depicts a block diagram of an example computer system, in accordance with one or more aspects of the present disclosure.

FIG. 10 depicts a block diagram of an example computer system, in accordance with one or more aspects of the present disclosure. Processor 1610 may be provided by some version of the processor 102 capable of performing return address verification, as described in more details herein above.

The system 1600 schematically illustrated by FIG. 10 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 10 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 10, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 11:
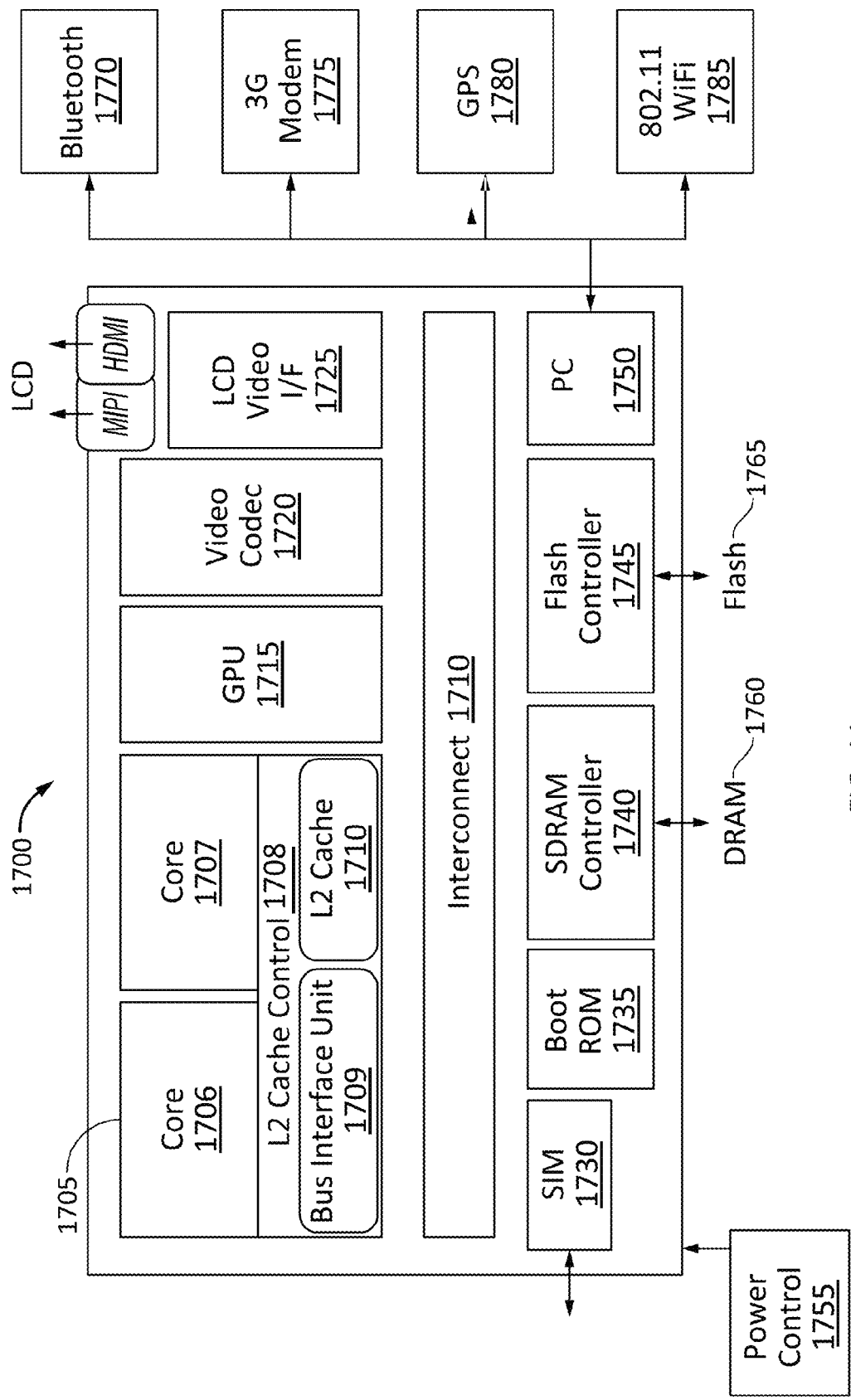
FIG. 11 depicts a block diagram of an example system on a chip (SoC), in accordance with one or more aspects of the present disclosure.

FIG. 11 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 11, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: a plurality of processing cores, each processing core communicatively coupled to a last level cache (LLC) slice; and a cache control logic coupled to the plurality of processing cores, the cache control logic configured to perform one of: making an LLC slice of an inactive processing core available to an active processing core or power gating the LLC slice, based on estimating cache requirements by active processing cores.

In Example 2, the processing cores of the processing system of Example 1 may be communicatively coupled to a random access memory (RAM).

In Example 3, the cache control logic of the processing system of Example 2 may be configured to minimize a sum of energy consumption by the processing system and the RAM.

In Example 4, the cache control logic of the processing system of Example 2 may be configured to compare a first energy to be consumed to power on the LLC slice and a second energy to be consumed to access the RAM if the LLC slice remains power gated.

In Example 5, the cache control logic of the processing system of Example 4 may be further configured, responsive to determining that the second energy exceeds the first energy, to make the LLC slice available to the active processing core.

In Example 6, the cache control logic of the processing system of Example 4 may be further configured, responsive to determining that the first energy exceeds the second energy, to power gate the LLC slice.

In Example 7, each LLC slice of the processing system of Example 1 may comprise a first plurality of N-way cache sets designated as control sets and a second plurality of (N+K)-way cache sets designated as sample sets, wherein K and N are positive integers.

In Example 8, the cache control logic of the processing system of Example 7 may be configured to compare a difference between a number of misses in the sample sets and a number of misses in the control sets to a ratio of idle power consumption of a plurality of LLC slices over a sampling period to a difference of a first energy consumed by RAM access and a second energy consumed by remote LLC access.

Example 9 is a processing system, comprising: a plurality of processing cores, each processing core communicatively coupled to a last level cache (LLC) slice; and a cache control means coupled to the plurality of processing cores, the cache control means configured to perform one of: making an LLC slice of an inactive processing core available to an active processing core or power gating the LLC slice, based on estimating cache requirements by active processing cores.

In Example 10, the processing cores of the processing system of Example 9 may be communicatively coupled to a random access memory (RAM).

In Example 11, the cache control means of the processing system of Example 10 may be configured to minimize a sum of energy consumption by the processing system and the RAM.

In Example 12, the cache control means of the processing system of Example 10 may be configured to compare a first energy to be consumed to power on the LLC slice and a second energy to be consumed to access the RAM if the LLC slice remains power gated.

In Example 13, the cache control means of the processing system of Example 12 may be further configured, responsive to determining that the second energy exceeds the first energy, to make the LLC slice available to the active processing core.

In Example 14, the cache control means of the processing system of Example 12 may be further configured, responsive to determining that the first energy exceeds the second energy, to power gate the LLC slice.

In Example 15, each LLC slice of the processing system of Example 9 may comprises a first plurality of N-way cache sets designated as control sets and a second plurality of (N+K)-way cache sets designated as sample sets, wherein K and N are positive integers.

In Example 16, the cache control means of the processing system of Example 15 may be configured to compare a difference between a number of misses in the sample sets and a number of misses in the control sets to a ratio of idle power consumption of a plurality of LLC slices over a sampling period to a difference of a first energy consumed by RAM access and a second energy consumed by remote LLC access.

In Example 17, a processing core of the processing system of any of the Examples 1-16 may be provided by a cluster comprising two or more processing cores.

In Example 18, a processing core of the processing system of any of the Examples 1-16 may further comprise a private first level cache.

In Example 19, a processing core of the processing system of the Example 18 may further comprise a private mid-level cache.

Example 20 is a method, comprising: determining, by a processing system comprising a plurality of processing cores, a first energy to be consumed to power on an LLC slice of an inactive processing core; determining a second energy to be consumed to access the RAM if the LLC slice is power gated; and responsive to determining that the second energy exceeds the first energy, making the LLC slice available to an active processing core.

In Example 21, the method of the Example 20 may further comprise power gating the LLC slice responsive to determining that the first energy exceeds the second energy.

In Example 22, the method of the Example 21 may further comprise providing, for an LLC slice of the active processing core, a first plurality of N-way cache sets designated as control sets and a second plurality of (N+K)-way cache sets designated as sample sets, wherein K and N are positive integers.

In Example 23, making the LLC slice available to an active processing core of Example 20 may comprise preventing the LLC slice from off/on oscillations.

In Example 24, determining the second energy of Example 20 may comprise determining a difference between a number of misses in sample sets of the active processing core and a number of misses in control sets of the active processing core.

Example 25 is an apparatus comprising: a memory; and a processing system coupled to the memory, the processing system configured to perform the method of any of the Examples 20-24.

Example 26 is a computer-readable non-transitory storage medium comprising executable instructions that, when executed by a processing system comprising a plurality of processing cores, cause the computing system to perform the method of any of the Examples 20-24.

Example 27 is a computer-readable non-transitory storage medium comprising executable instructions that, when executed by a processing system comprising a plurality of processing cores, cause the computing system to perform operations, comprising: determining, by a processing system comprising a plurality of processing cores, a first energy to be consumed to power on an LLC slice of an inactive processing core; determining a second energy to be consumed to access the RAM if the LLC slice is power gated; and responsive to determining that the second energy exceeds the first energy, making the LLC slice available to an active processing core.

In Example 28, the executable instructions of the computer-readable non-transitory storage medium of Example 27 may further comprise: power gating the LLC slice responsive to determining that the first energy exceeds the second energy.

In Example 29, the executable instructions of the computer-readable non-transitory storage medium of Example 27 may further comprise: providing, for an LLC slice of the active processing core, a first plurality of N-way cache sets designated as control sets and a second plurality of (N+K)-way cache sets designated as sample sets, wherein K and N are positive integers.

In Example 30, making the LLC slice available to an active processing core of the computer-readable non-transitory storage medium of Example 27 may further comprise preventing the LLC slice from off/on oscillations.

In Example 31, determining the second energy of the computer-readable non-transitory storage medium of Example 27 may further comprise determining a difference between a number of misses in sample sets of the active processing core and a number of misses in control sets of the active processing core.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
a plurality of processing cores comprising an active processing core and an inactive processing core, each processing core communicatively coupled to a respective last level cache (LLC) slice, each LLC slice comprising a first plurality of control cache sets and a second plurality of sample cache sets, each of the control cache sets comprising a first pre-defined number of associative ways and each of the sample cache sets comprises a second pre-defined number of associative ways, wherein the second pre-defined number exceeds the first pre-defined number; and
a cache control logic coupled to the plurality of processing cores, the cache control logic to:
determine a first energy to be consumed to power on an LLC slice of the inactive processing core,
determine a number of misses in the sample cache sets of the active processing core over a sampling period,
determine a number of misses in the control cache sets of the active processing core over the sampling period,
determine a second energy to be consumed to access a random access memory (RAM) if the LLC slice is power gated, as a function of a difference between the number of misses in the sample cache sets and the number of misses in the control cache sets, and
responsive to determining that the second energy exceeds the first energy, make the LLC slice available to the active processing core.

2. The processing system of claim 1, wherein a processing core of the plurality of processing cores is provided by a cluster comprising two or more processing cores.

3. The processing system of claim 1, wherein each processing core further comprises a private first level cache.

4. The processing system of claim 3, wherein each processing core further comprises a private mid-level cache.

5. The processing system of claim 1, wherein the cache control logic is further to, responsive to determining that the first energy exceeds the second energy, power gate the LLC slice.

6. A method, comprising:
determining, by a processing system comprising a plurality of processing cores including an active processing core and an inactive processing core, a first energy to be consumed to power on a last level cache (LLC) slice of the inactive processing core, wherein the LLC slice comprises a first plurality of control cache sets and a second plurality of sample cache sets, each of the control cache sets comprising a first pre-defined number of associative ways and each of the sample cache sets comprises a second pre-defined number of associative ways, wherein the second pre-defined number exceeds the first pre-defined number;
determine a number of misses in the sample cache sets of the active processing core over a sampling period,
determine a number of misses in the control cache sets of the active processing core over the sampling period,
determining a second energy to be consumed to access a random access memory (RAM) if the LLC slice is power gated, as a function of a difference between the number of misses in the sample cache sets and the number of misses in the control cache sets; and
responsive to determining that the second energy exceeds the first energy, making the LLC slice available to the active processing core.

7. The method of claim 6, further comprising power gating the LLC slice responsive to determining that the first energy exceeds the second energy.

8. The method of claim 6, wherein making the LLC slice available to the active processing core comprises preventing the LLC slice from off/on oscillations.

9. A computer-readable non-transitory storage medium comprising executable instructions that, when executed by a processing system comprising a plurality of processing cores including an active processing core and an inactive processing core, cause the computing system to perform operations, comprising:
determining a first energy to be consumed to power on an a last level cache (LLC) slice of the inactive processing core, wherein the LLC slice comprises a first plurality of control cache sets and a second plurality of sample cache sets, each of the control cache sets comprising a first pre-defined number of associative ways and each of the sample cache sets comprises a second pre-defined number of associative ways, wherein the second pre-defined number exceeds the first pre-defined number;
determine a number of misses in the sample cache sets of the active processing core over a sampling period,
determine a number of misses in the control cache sets of the active processing core over the sampling period,
determining a second energy to be consumed to access a random access memory (RAM) if the LLC slice is power gated, as a function of a difference between the number of misses in the sample cache sets and the number of misses in the control cache sets; and
responsive to determining that the second energy exceeds the first energy, making the LLC slice available to the active processing core.

10. The computer-readable non-transitory storage medium of claim 9, wherein the executable instructions further comprise:
power gating the LLC slice responsive to determining that the first energy exceeds the second energy.

11. The computer-readable non-transitory storage medium of claim 9, wherein a processing core is provided by a cluster comprising two or more processing cores.

12. The computer-readable non-transitory storage medium of claim 9, wherein making the LLC slice available to the active processing core comprises preventing the LLC slice from off/on oscillations.

13. The processing system of claim 1, wherein making the LLC slice available to the active processing core comprises preventing the LLC slice from off/on oscillations.

14. The method of claim 6, wherein a processing core of the plurality of processing cores is provided by a cluster comprising two or more processing cores.

15. The processing system of claim 1, wherein the cache control logic is further to:
   apply an exponential weighted moving average (EWMA) filter to an average number of missed observed over several sampling periods.

16. The processing system of claim 1, wherein determining the first energy comprises multiplying an idle power consumption of an LLC slice by a duration of the sampling period.

17. The method of claim 6, further comprising:
   applying an exponential weighted moving average (EWMA) filter to an average number of missed observed over several sampling periods.

18. The method of claim 6, wherein determining the first energy comprises multiplying an idle power consumption of an LLC slice by a duration of the sampling period.

19. The computer-readable non-transitory storage medium of claim 9, wherein the executable instructions further comprise: applying an exponential weighted moving average (EWMA) filter to an average number of missed observed over several sampling periods.

20. The computer-readable non-transitory storage medium of claim 9, wherein determining the first energy comprises multiplying an idle power consumption of an LLC slice by a duration of the sampling period.

\* \* \* \* \*